2,816,836
Patented Dec. 17, 1957

United States Patent Office

2,816,836

METHOD FOR AGING MEAT

Beverly E. Williams, San Mateo, Calif., assignor, by mesne assignments, to Hodges Research & Development Company, Inc., New York, N. Y., a corporation of California No Drawing. Application October 12, 1955,
Serial No. 540,161

9 Claims. (Cl. 99—107)

This invention relates to a method for processing meat and it relates more particularly to the production of a tenderized beef and to a method for accelerating the tendering of meat.

It is an object of this invention to produce and to provide a method for producing a tenderized meat product in a simple and efficient manner, at considerably less time than is required for a conventional natural aging process; without loss in taste or texture; without loss in color or appearance; without excessive deterioration or sliming; without excessive loss from desiccation; without excessive loss from trim, and with improved tendering thereby markedly to increase the turn-over of the beef and the turn-over of the space required for the processing thereof.

While utilization can be made of freshly killed meats soon after kill and after rigor mortis has been completed, certain meats, as represented by beef, are greatly improved in texture, taste and tenderness if aged for a certain period of time after rigor mortis has been completed to enable the enzymes present in the meat to act and bring about a noticeable tendering effect.

In the normal aging process, the beef is separated into its various cuts, hung or otherwise stored in a refrigerated space for a time sufficient to permit the natural enzymes to carry out their tendering processes. It is believed necessary carefully to control the temperature conditions during the aging process to avoid excessive decomposition and bacterial growth and for this purpose, the refrigerated space in which the aging is carried out is usually maintained at a temperature of about 34° F. At this temperature, the activity of the enzymes is retarded, to the extent that a minimum of about 21 days is required to achieve a noticeable tendering effect. While these conditions are not difficult to meet, it is undesirable, from the standpoint of the amount of space that is tied up for tendering the meat, and it is also undesirable from the effect which it has in tying up large volumes of meat in storage and in carefully controlled refrigerated rooms.

If the temperature for aging is increased for purposes of accelerating the activity of the enzymes for tendering the beef, the bacteria become active also under the conditions existing to cause spoilage of the meat and putrefaction with consequent loss and mold growth is also accelerated to such an extent that appreciable losses are incurred by reason of the trimming necessary to remove the decomposed or molded parts.

If the humidity in the refrigerated space is kept low enough to retard mold growth, the surface portions of the beef become desiccated and discolored with consequent loss by shrinkage and with loss from the trim required to cut off the desiccated and discolored parts.

When, under ideal conditions, the refrigerated space is maintained at a temperature of about 34° F. to hold down bacterial growth and a relative humidity of about 80 percent to hold down mold growth, the rate of aging is also held down so that a minimum of 21 days is required to achieve the desired tendering effect. The low relative humidity causes shrinkage in amounts ranging from 3 to 5 percent by weight and the need for trimming off the discolored and desiccated parts adds further loss of from 8 to 12 percent by weight. Thus in addition to the tie-up of considerable volumes of refrigerated space and in addition to the tie-up of vast amounts of beef, the conventional aging processes are objectionable also from the standpoint of loss which is experienced due to shrinkage and trim.

Various means have been investigated by the butchering and meat packing trade to accelerate the aging process of meat and to cut down on the waste and the tie-up of large volumes of refrigerated space and meats without loss in taste, texture, quality or appearance of the naturally aged meat. To the present, the slow and wasteful natural aging process is still preferred over other processes which have heretofore been proposed.

Commercial use has been made of an accelerated aging process wherein the meat is aged, after rigor mortis has set in, at an elevated temperature within the range of 60–68° F. and about 80 percent relative humidity to increase the activity of the enzymes and in which use is made of ultra violet light to retard bacteria and mold growth. While the tendering process is greatly accelerated at the higher temperatures employed to cut down on the time required for aging and to cut down on the loss and shrinkage, certain defects exist in this commercial process.

At the higher temperatures employed, the meat is aged in 60 hours as compared to the 21 days required at 34° F. However, before aging can be started it is necessary to chill the meat down to a safe temperature of below 40° F. where rigor mortis is completed before the accelerated aging process can be employed by reheating the meat for storage at a temperature within the range of 60–68° F. This chilling and reheating of the meat not only calls for a waste of heat, but once the meat has been chilled to a safe temperature, reheating more or less permanently softens the meat so that it becomes difficult to firm and form the meat for domestic use.

In addition, at least 1½ to 2 days are required to complete rigor mortis and an additional 1 day is required to firm the meat with the result that at least 5½ to 6 days are required to process the meat for domestic use.

More important, however, is the fact that at a temperature in excess of 60° F., certain harmful bacteria such as the Staphylococcus bacteria are able to grow and it is therefore undesirable to make use of a tenderizing process in which the meat is held for any length of time at a temperature in excess of 60° F.

When use is made of ultra violet light to inhibit bacterial growth and mold growth, the oxygen in the air is broken down by the lights into ozone which appears to impart a rancidity to the meat to the extent that a rancid odor can be detected in the vicinity of the aged meat and a different taste is acquired by the meat. If the lights are directed onto the meat, it tends to sunburn or discolor the meat characteristic of the change of the hemoglobin from an oxy-hemoglobin to a meta-hemoglobin. Even when the lights are not directed onto the meat, the characteristic white fat on the meat is turned to a yellow discoloration.

The ultra violet light necessitates the wearing of special glasses by operators and the cost for operation of the lights offsets in part the savings secured in the turn-over in meat and refrigerated space.

In accordance with the practice of this invention, a tenderizing process is provided wherein the beef is aged at a temperature below 60° F. but above 45° F. and preferably at a temperature of about 50° F. Under these conditions, growth of Staphylococcus and other harmful bacteria is prevented if the enzymes are activated sufficiently to achieve in 3 to 4 days the tenderizing which is secured by the natural aging process in 21 days at 34° F. 1½ days are still required to complete rigor mortis after the beef is killed and an additional ½ to 1 day is required to firm the beef before the accelerated aging process can be employed. However, instead of chilling the beef down to a temperature of below 40° F., the beef treated in accordance with the practice of this invention may be cooled down to the temperature for aging wherein rigor mortis can be completed and the meat firmed without reheating the beef for the accelerated aging step.

Under the temperature conditions described, aging can be accelerated under humidity conditions corresponding to those previously employed (about 80 percent relative humidity, but it is preferred to make use of higher humidity conditions more closely approaching 100 percent relative humidity and preferably in excess thereof to provide ideal conditions for catalyzing the activity of the enzymes.

In combination with the increased temperature and humidity conditions described, the accelerated aging process embodying the features of this invention makes use of an atmosphere which is treated to contain thamnidium. As used herein, the term "thamnidium" is meant to include the class of molds referred to as phycomycetes, in the order of mucorales and in the family of mucoraceae. Eight strains of thamnidium have been identified and the term "thamnidium" is intended to include any one or more of these strains or mutations thereof or hybrids thereof.

The amount of thamnidium introduced into the atmosphere in the space for aging is unimportant because they propagate very rapidly when they collect on the surface of the meat under the conditions described. The thamnidium present on the surface of the meat has been found effective under the conditions described to hold down bacteria growth by the process of either eating up the bacteria in the air or on the surface of the meat or else depriving the bacteria of some of the elements necessary for growth. In any event, the presence of thamnidium in the air or on the surface of the meat minimizes bacterial growth and sliming even under the conditions of high temperature and humidity which are employed in combination therewith in the accelerated aging process.

In addition, the thamnidium on the surface of the meat appears to act positively in the tendering process of the meat and also to be effective in imparting the black walnut taste which is characteristic of carefully and properly aged meat. From examinations which have been made, it appears that the thamnidium on the surface of the meat secretes and extends its mycelia into the meat as roots. After about 4 days of rooting, the hyphae or "whiskers" start to grow on the surface. It is believed that the sinking of the mycelia into the meat tends to tenderize the meat and to improve the naturally aged taste of the meat.

When it is desired to save on trim loss, use can be made of the meat tenderized in accordance with the practice of this invention immediately following the third or fourth day of aging, before the whiskers or mold are formed on the surface. If the meat is aged for additional time, the whiskers representative of mold growth can be scraped from the surface of the meat and it may be necessary to trim a surface portion. However, the amount of trim loss is considerably less and full aging can be secured within the 5 to 7 days described from the time of kill including 2 days for rigor mortis. The presence of whiskers or mold growth on the surface of meat is sometimes desirable because is provides positive indication that the growth of bacteria has been retarded. When high humidities in the range of 100 percent relative humidity or supersaturation are employed, shrink loss is negligible. Thus, complete aging is secured at about one-third the time required for natural aging processes with less loss in shrink or trim and without loss in taste, texture, quality or appearance.

The described aging process for meat can be employed to advantage in combination with the meat chilling process described in the recently issued Morrison Patent No. 2,705,678 wherein description is made of means and equipment for chilling meat under supersaturated conditions by introducing a refrigerated air which is supersaturated with moisture in the form of vapor as distinguished from free water. Supersaturation by vapor is achieved by the process of withdrawing air at or near saturation from the refrigerated space by means of compression fans which place the withdrawn air under slight positive pressure. The heat of compression is extracted from the air without extraction of moisture over and above that for saturation of the cold compressed air by passing the cooled and compressed air over cooling coils and then the air is expanded, while doing work, to atmospheric pressure with resulting drop in temperature whereby the amount of moisture which remains in the air in vapor form is in excess of the amount required for saturation. The refrigerated air supersaturated with an amount of moisture in excess of the temperature differential in the refrigerated space is introduced into the space for chilling the meat. Under such conditions, the meat is chilled from a temperature of about 100–105° F., when freshly killed, to a temperature of below 38° F. in about 18 to 24 hours.

Instead of setting the controls for a temperature of 32–34° F. in the refrigerated space, the described turbo-refrigeration unit may be set for maintaining a temperature of about 50° ±5° F. in the space for aging. This can be accomplished by proper adjustment of the temperature or rate of flow of the cooling medium employed for the extraction of heat of compression from the compressed air in the expansion turbine.

The turbo-refrigeration unit not only provides the desired control for maintaining the temperature and humidity conditions within the space for aging, but it also provides an excellent means for the introduction of thamnidium into the space for aging. In operation, the thamnidium can be introduced into the system prior to the introduction of the expanded air into the space by introducing the thamnidium into the intake or after the compression fans but it is preferred to introduce the thamnidium into the system immediately prior to or imediately after expansion while the air is in a dry and turbulent state for vaporization and distribution of thamnidium uniformly throughout the air introduced into the space for aging. Thus the space can be kept constantly clean and free of foreign materials and devices which might otherwise be necessary for suspension of thamnidium in the air of the space for aging.

While the thamnidium may be introduced continuously into the air stream, it is preferred periodically to make an introduction of thamnidium into the space for aging. The thamnidium reaches for the surface of the meat and it multiplies for service as described. Intermittent introduction is, however, desirable to make certain of the constant protection against bacterial growth and to supplement and reinforce the thamnidium to insure its victory over the bacteria.

The following will illustrate a cycle for the processing of beef in accordance with the practice of this invention, starting with the killing floor to the aged meat butchered for domestic use. From the kill floor, the dressed sides of beef at a temperature of about 100° to 105° F. are loaded into a chill room for a reduction in temperature to about 45° F. Chilling is preferably carried out in a room serviced with a turbo-refrigeration system of the type described in the aforementioned Morrison patent or it may be carried out in a chill room of the type described serviced with brine coils for cooling. If a turbo-refrigeration system is employed, chilling to a safe temperature will require about 18 hours but 1½ to 2 days will be required for rigor mortis to be completed and to firm up the meat. If a brine system is employed, 3 to 4 days may be required for cooling and to complete rigor mortis.

From the chill room, the sides of beef will be cut up and then loaded into an enclosed space for aging in which the room is maintained at a temperature of about 50° F. and a humidity which is above 80 percent relative humidity and preferably within the range of 95 percent relative humidity to supersaturation. Thamnidium is introduced into the atmosphere at the start and may be introduced periodically thereafter about every 3 to 12 hours. After 3 to 4 days, the meat can be removed from the room for butchering without necessity to trim the meat since little, if any, discoloraton will occur; little, if any, desiccation will have taken place, and little, if any, mold will have grown on the surface.

If the meat is held for more than 3 to 4 days in the aging room, then some trim will be required to remove the mold that naturally forms on the surface.

It will be apparent from the foregoing that I have provided a new and improved process for tendering meat such as beef in a time which is about one-third of that required for a natural aging process without loss in taste, texture, quality or appearance of the meat. It will be apparent also that the accelerated aging process described provides for the production of tenderized meat having characteristics corresponding to that of naturally aged meat in about one-third of the time without requiring special equipment, without the discoloration or rancidity developed in accelerated processes heretofore employed, and with little, if any, loss from shrinkage or trim, such as is characteristic of the natural aging process.

It will be understood that changes may be made in the details of the process, such as the temperature and humidity conditions employed, and the methods of handling the meat, without departing from the spirit of the invention, especially as defined in the following claims.

I claim:

1. In the method for aging beef, the steps of introducing the beef after rigor mortis has been completed into an enclosed space maintained at a temperature greater than 45° F. but less than 60° F. and a relative humidity greater than 80 percent, and introducing thamnidium into the space at the start of the aging cycle whereby the beef becomes properly aged within a 7 day period under the conditions described.

2. The method as claimed in claim 1 which includes the additional step of firming the beef after rigor mortis has been completed and prior to introduction into the space for aging.

3. The method as claimed in claim 1 in which the temperature is maintained at about 50° F. for aging.

4. The method as claimed in claim 1 in which the relative humidity within the space is maintained in excess of 95 percent.

5. The method as claimed in claim 1 in which a supersaturated atmosphere is maintained within the said space.

6. In the method for aging beef, the steps of introducing the beef after rigor mortis has been completed into an enclosed space maintained at a temperature greater than 45° F. but less than 60° F. and a relative humidity greater than 80 percent, introducing thamnidium into the space at the start of the aging cycle whereby the beef becomes properly aged within a 5 day period under the conditions described, and removing the beef after it has been in the space under the conditions described within the 5 day period.

7. In the method for aging meat, the steps of introducing the meat after rigor mortis has been completed into an enclosed space, introducing air into the space which is supersaturated with moisture in vapor form as distinguished from free water in particle form to maintain supersaturated conditions within the space, maintaining the temperature within the space in the range of 45–60° F., and introducing thamnidium into the air introduced into the space at least at the start of the aging cycle whereby the beef becomes properly aged within a period less than 7 days.

8. The method as claimed in claim 7 which includes the additional step of removing the meat after exposure of 3 days under the conditions existing within the space.

9. The method as claimed in claim 7 in which the thamnidium is introduced into the air at the start of the cycle and periodically thereafter until aging is completed.

References Cited in the file of this patent

UNITED STATES PATENTS

| | | |
|---|---|---|
| 2,221,689 | Jensen | Nov. 12, 1940 |
| 2,339,507 | Nagy et al. | Jan. 18, 1944 |
| 2,419,119 | Christensen | Apr. 15, 1947 |
| 2,705,678 | Morrison | Apr. 5, 1955 |

OTHER REFERENCES

"Microbiology of Meats," second edition, 1945, by L. B. Jensen, published by The Garrard Press, Champaign, Ill., pages 161 and 248 to 250.